United States Patent
Prosyk (10) Patent No.: US 9,804,425 B1
(45) Date of Patent: Oct. 31, 2017

(54) OPTICAL SYSTEM WITH BAND GAP TUNING

(71) Applicant: Kelvin Prosyk, Luskville (CA)

(72) Inventor: Kelvin Prosyk, Luskville (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/299,214

(22) Filed: Oct. 20, 2016

(51) Int. Cl.
| G02F 1/025 | (2006.01) |
| G02F 1/01 | (2006.01) |
| G02F 1/225 | (2006.01) |
| G02F 1/21 | (2006.01) |

(52) U.S. Cl.
CPC ............ G02F 1/025 (2013.01); G02F 1/0123 (2013.01); G02F 1/2257 (2013.01); *G02F 2001/212* (2013.01); *G02F 2201/127* (2013.01)

(58) Field of Classification Search
CPC ...... G02F 1/025; G02F 1/0123; G02F 1/2257; G02F 2201/127; G02F 2001/212; G02F 1/01; G02F 1/0102; G02F 1/011; G02F 1/0121; G02F 1/03; G02F 1/0305; G02F 1/0316; G02F 1/0327; G02F 1/0344; G02F 1/035; G02F 1/21
See application file for complete search history.

(56) References Cited

U.S. PATENT DOCUMENTS 6,516,017 B1 * 2/2003 Matsumoto ........... H01S 5/0265
372/20
2015/0286108 A1 10/2015 Prosyk et al.

\* cited by examiner

*Primary Examiner* — John M Bedtelyon
(74) *Attorney, Agent, or Firm* — Osha Liang LLP (57) ABSTRACT

A method for operating an optical system may include selecting a band gap energy level for an optical waveguide in an electro-optic modulator. The band gap energy level may correspond to a predetermined phase shift efficiency of a waveguide electrode coupled to the optical waveguide. The method may further include generating, across a conductive plane in the electro-optic modulator, a differential voltage that produces a predetermined temperature in a waveguide core of the optical waveguide. The predetermined temperature may correspond to the band gap energy level selected for the optical waveguide. The method may further include transmitting, through the optical waveguide and with a modulating voltage applied by the waveguide electrode, an optical wave to an optical wave combiner. The modulating voltage may produce an amount of phase shift in the optical wave at the predetermined phase shift efficiency.

20 Claims, 6 Drawing Sheets

OPTICAL SYSTEM WITH BAND GAP TUNING

BACKGROUND

An electro-optic modulator may modulate optical waves in response to an input voltage. Using the electro-optic effect, for example, the electro-optic modulator may modulate an optical wave with a particular phase, wavelength, amplitude and/or polarization. Likewise, the electro-optic modulator may modulate optical waves with a particular optical modulation format, such as intensity modulation.

SUMMARY

In general, in one aspect, the invention relates to a method for operating an optical system. The method includes selecting a band gap energy level for an optical waveguide in an electro-optic modulator. The band gap energy level corresponds to a predetermined phase shift efficiency of a waveguide electrode coupled to the optical waveguide. The method further includes generating, across a conductive plane in the electro-optic modulator, a differential voltage that produces a predetermined temperature in a waveguide core of the optical waveguide. The predetermined temperature corresponds to the band gap energy level selected for the optical waveguide. The method further includes transmitting, through the optical waveguide and with a modulating voltage applied by the waveguide electrode, an optical wave to an optical wave combiner. The modulating voltage produces an amount of phase shift in the first optical wave at the predetermined phase shift efficiency.

In general, in one aspect, the invention relates to an optical system including an optical wave combiner. The optical system further includes a first optical waveguide coupled to the optical wave combiner and configured to transmit a first optical wave to the optical wave combiner. The optical system further includes a waveguide electrode coupled to the first optical waveguide. The waveguide electrode is configured to apply a modulating voltage to the first optical waveguide to produce an amount of phase shift in the first optical wave. The optical system further includes a second optical waveguide coupled to the optical wave combiner and configured to transmit a second optical wave to the optical wave combiner. The optical system further includes a conductive plane extending underneath the first optical waveguide and the second optical waveguide. The optical system further includes a voltage tap coupled to the conductive plane. The voltage tap is configured to generate a differential voltage across the conductive plane. The differential voltage is configured to produce a predetermined temperature in a waveguide core of the first optical waveguide. The predetermined temperature corresponds to a band gap energy level and a predetermined phase shift efficiency of the waveguide electrode in applying the modulating voltage.

In general, in one aspect, the invention relates to a non-transitory computer readable medium (CRM) storing various instructions for operating an optical system. The instructions include functionality for selecting a band gap energy level for an optical waveguide in an electro-optic modulator. The band gap energy level corresponds to a predetermined phase shift efficiency of a waveguide electrode coupled to the optical waveguide. The instructions further include functionality for generating, across a conductive plane in the electro-optic modulator, a differential voltage that produces a predetermined temperature in a waveguide core of the optical waveguide. The predetermined temperature corresponds to the band gap energy level selected for the optical waveguide. The instructions further include functionality for transmitting, through the optical waveguide and with a modulating voltage applied by the waveguide electrode, an optical wave to an optical wave combiner. The modulating voltage produces an amount of phase shift in the optical wave at the predetermined phase shift efficiency.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments are directed towards an optical system, a method of operating an optical system, and a computer-readable medium. In particular, one or more embodiments are directed to a method that includes selecting a particular band gap energy level for an optical waveguide. For example, the optical waveguide may be located in an electro-optic modulator and be configured to phase modulate an optical wave that is transmitted through the optical waveguide. In one or more embodiments, after selecting the band gap energy level, a differential voltage may be generated across a conductive plane proximate to the optical waveguide. Accordingly, the differential voltage may increase the temperature around the optical waveguide and thus the temperature inside the waveguide's core to implement the selected band gap energy level. At the selected band gap energy level, an optical wave transmitted through the optical waveguide may experience a lower probability of photon absorption and/or increased phase shift efficiency of a waveguide electrode applying a modulating voltage to the optical waveguide.

Figure 1:
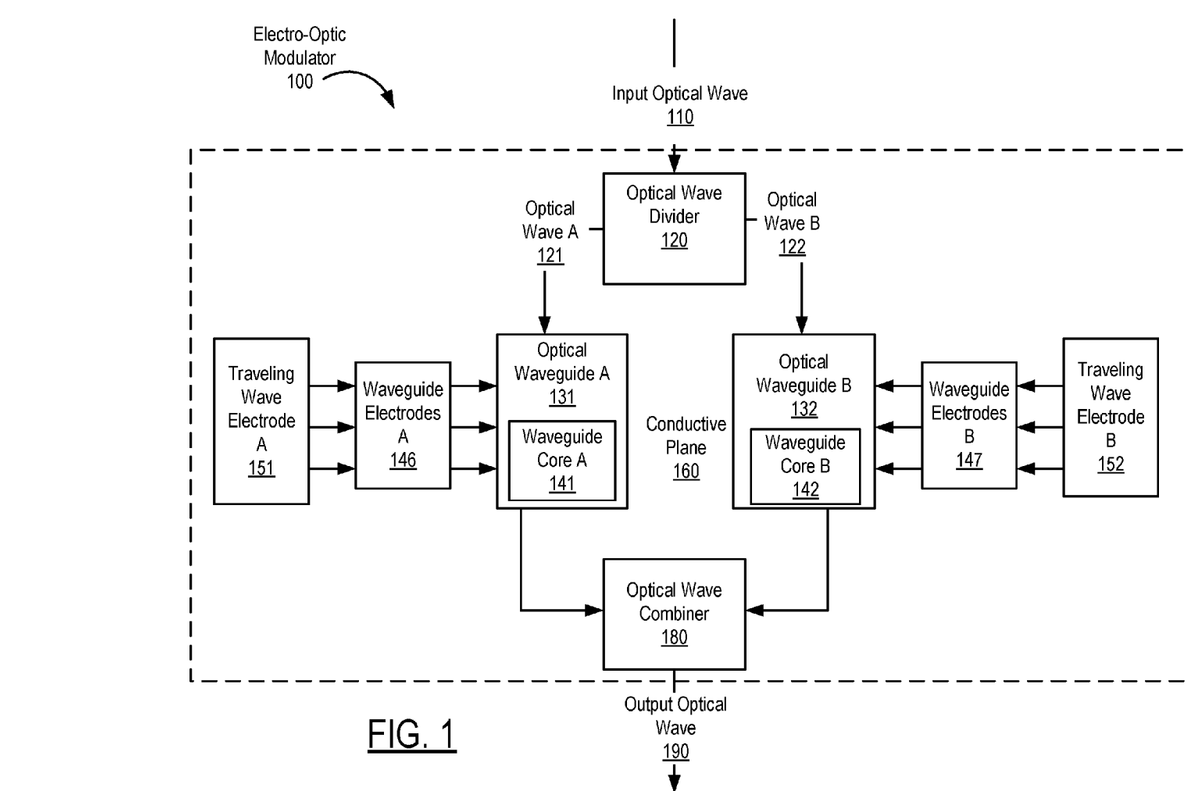
FIG. 1 shows a system in accordance with one or more embodiments.

FIG. 1 shows a schematic diagram of an electro-optic modulator (100) in accordance with one or more embodiments. In one or more embodiments, the electro-optic modulator (100) includes an optical wave divider (120) connected to a pair of optical waveguides (i.e., optical waveguide A (131), optical waveguide B (132)). For example, the optical wave divider (120) may be a beam splitter or other optical structure that includes functionality for separating an input optical wave (110) into two or more optical waves. As such, the optical wave divider (120) may transform the input optical wave (110) into optical wave A (121) and optical wave B (122) and transmit the optical waves (121, 122) to the optical waveguides (131, 132), respectively. An optical wave combiner (180) may be an optical structure that superimposes two input optical waves (e.g., optical wave A (121), optical wave B (122)) to form an output optical wave (e.g., output optical wave (190)).

The electro-optic modulator (100) may include a traveling wave electrode (TWE) (e.g., traveling wave electrode A (151), traveling wave electrode B (152)) for phase modulating various optical waves (e.g., optical wave A (121), optical wave B (122)) transmitted through the optical waveguides (131, 132). Specifically, a travelling wave electrode may include functionality to generate a modulating electric field in an optical waveguide using one or more waveguide electrodes (e.g., waveguide electrodes A (146), waveguide electrodes (147)). For example, a traveling wave electrode may be segmented and oriented substantially parallel to an optical path through one of the optical waveguides (131, 132). As such, the traveling wave electrode may include two or more transmission line conductors (not shown) that are each connected to respective waveguide electrodes (i.e., waveguide electrodes A (147), waveguide electrodes B (148)) along an optical waveguide. For example, a respective waveguide electrode may be connected to a respective transmission line conductor via a corresponding bridge conductor. Moreover, the bridge conductor may branch out of a transmission line conductor in a direction substantially perpendicular to an optical path through an optical waveguide. Accordingly, a transmission line conductor may convey a radio frequency (RF) signal along an RF path that may be substantially parallel to an optical path within an optical waveguide.

Keeping with FIG. 1, the optical waveguides (131, 132) may include, for example, optical transmission media that include functionality for guiding an optical wave (e.g., optical wave A (121), optical wave B (122)) through the electro-optic modulator (100). In one or more embodiments, for example, the optical waveguides (131, 132) are planar waveguides with parallel waveguide branches that extend from the optical wave divider (120) to the optical wave combiner (180). Accordingly, the optical waveguides (131, 132) may be coupled with respective waveguide electrodes (i.e., waveguide electrodes A (146), waveguide electrodes B (147)) for performing phase modulation. Likewise, the respective waveguide electrodes (146, 147) may extend over a p-i-n junction along a corresponding optical waveguide.

Moreover, an optical waveguide may include a waveguide core (e.g., waveguide core A (141), waveguide core B (142)). In particular, a waveguide core may be an optical transmission medium that includes functionality for transmitting an optical wave through the optical waveguide. For example, the waveguide core may include material with a high index of refraction with respect to one or more surrounding regions of the optical waveguide that has material with a low index of refraction. For example, a waveguide core in a planar waveguide may be a layer (also called "film") interposed between two layers that each have a lower index of refraction than the waveguide core.

In one or more embodiments, the waveguide cores (141, 142) are configured with a predetermined band gap energy level. In particular, the band gap energy level may be a threshold that describes a specific amount of energy required to promote a valence electron in an optical waveguide to become a conduction electron. In some embodiments, the band gap energy level may be a range representing possible band gap energy values within an optical waveguide. In promoting the valence electron to be a conduction electron, a portion of the waveguide core may result in photon absorption within the optical waveguide. Thus, increasing and/or decreasing the temperature of a waveguide core may raise or lower the band gap energy level accordingly. Likewise, different sections of an optical waveguide may have different band gap energies based on variations in materials that form the optical waveguide. As such, the band gap energy level may describe different band gap energies within some degree of precision and/or tolerance. In another embodiment, the band gap energy level may refer to an average band gap energy found within an optical waveguide material.

In one or more embodiments, a waveguide core is composed at least partially of a direct band gap semiconductor material. For example, different semiconductor materials may have different band gap energy levels. As such, the type of semiconductor material that composes a waveguide core may affect the probability of photon absorption. In some embodiments, if the photon has energy below the band gap energy level of the semiconductor material, the photon may have a reduced probability of photon absorption when passing through the semiconductor material. With respect to FIG. 1, for example, the photon absorption may attenuate optical wave A (121) and/or optical wave B (122) and thereby reduce the intensity of the output optical wave (190). Thus, optical waves with photon energies below the band gap energy level may pass through the waveguide cores (141, 142) with little or no photon absorption.

Furthermore, the photon energy of a respective optical wave may be determined by the wavelength of the respective optical wave. For example, optical waves transmitted at higher frequencies may have higher photon energies than optical waves transmitted at lower frequencies. Likewise, the photon absorption of the optical waves (121, 122) may be a cumulative effect with other components of the electro-optic modulator. For example, the optical waves (121, 122) may experience optical loss from the optical wave divider (120), the optical wave combiner (180), and/or other optical waveguides (not shown), in addition to the optical loss caused by photon absorption in the optical waveguides (131, 132).

In one or more embodiments, the electro-optic modulator (100) includes a conductive plane (160). For example, the conductive plane (160) may be a metallic layer or a semiconductor layer that the optical waveguides (131, 132) are disposed above. In one or more embodiments, the conductive plane (160) includes a substantially conductive material, such as an n-type semiconductor. In another example, the conductive plane (160) may include doped silicon.

In one or more embodiments, the conductive plane (160) may be disposed underneath the optical waveguides (131, 132) as a physical support for the optical waveguides (131, 132) and various other components of the electro-optic modulator (100). For example, the conductive plane (160) may be interposed between the optical waveguides (131, 132) and a substrate layer of the electro-optic modulator (100). In some embodiments, the conductive plane (160) may provide an electric signal path for an electric modulation signal passing through the waveguide electrodes (146, 147). The conductive plane (160) may also include functionality to provide an equalizing DC control voltage throughout the electro-optic modulator (100).

In one or more embodiments, the conductive plane (160) includes functionality to generate a heated region around one or more electro-optic modulator components (e.g., optical waveguide A (131), optical waveguide B (132), optical wave divider (120)). The heated region may increase in temperature inside a particular component, which may also adjust the band gap energy level within the corresponding component. In one or more embodiments, for example, different electro-optic modulator components may have different temperatures to produce different band gap energy levels in the electro-optic modulator components. For more information on the conductive plane (160), see FIG. 2 and the accompanying description below.

Figure 2:
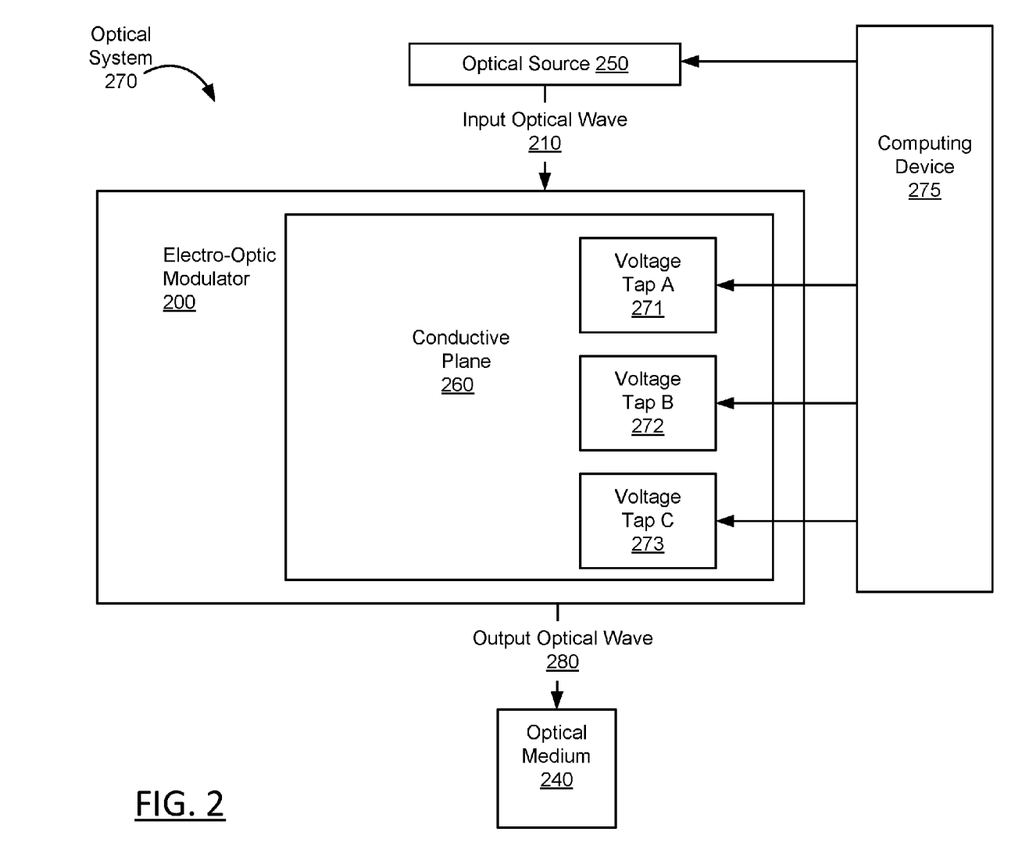
FIG. 2 shows a system in accordance with one or more embodiments.

Turning to FIG. 2, FIG. 2 shows a schematic diagram of an optical system (270) in accordance with one or more embodiments. As shown, the optical system (270) may include an electro-optic modulator (200) with a conductive plane (260), an optical source (250), an optical medium (240), and a computing device (275). The optical source (250) may be hardware that includes functionality to generate an input optical wave (210). For example, the optical source (250) may be a laser diode. Likewise, the electro-optic modulator (200) may be an electro-optic modulator similar to the electro-optic modulator (100) described in FIG. 1 and the accompanying description. As such, the electro-optic modulator (100) may include functionality to generate an output optical wave (280) for transmission to the optical medium (240). The optical medium (240) may be, for example, a single mode optical fiber, an optical waveguide, an optical device such as a photonic integrated circuit, etc. The computing device (275) may be a computing system similar to the computing system (600) described in FIG. 6 and the accompanying description.

In one or more embodiments, the conductive plane (260) is coupled with one or more voltage taps (e.g., voltage tap A (271), voltage tap B (272), voltage tap C (273)) (also called "voltage control taps"). In one or more embodiments, for example, a voltage tap is hardware that includes functionality to generate a differential voltage across a portion of the conductive plane (260). In one or more embodiments, the voltage taps (271, 272, 273) include functionality to generate an average electric potential across the conductive plane (260) while the differential voltage also produces a heating electric current through one or more regions of the conductive plane (260).

In one or more embodiments, for example, each voltage tap generates a respective differential voltage such that the sum of the respective differential voltages produces an average electric potential across the conductive plane (260). In one or more embodiments, for example, the voltage tap A (271) generates 4.5 V, the voltage tap B (272) generates 5.0 V, and the voltage tap C (273) generates 5.5 V. Accordingly, the voltage taps (271, 272, 273) may thereby produce an average electric potential of 5.0 V.

Keeping with FIG. 2, a voltage tap may be an electrical connection point between the conductive plane (260) and one or more power sources (not shown). For example, a voltage tap may be connected to a direct current (DC) power source, directly or indirectly, in order to provide a DC voltage across one or more regions of the conductive plane (260). Moreover, a voltage tap may be a strip of conductive material that is positioned underneath a travelling wave electrode (not shown). In one or more embodiments, for example, a voltage tap is a lateral protrusion of the conductive plane (260). In other embodiments, the material that composes the voltage taps (271, 272, 273) may differ from the material of the conductive plane (260). Moreover, the voltage tap may be made of n-InP or other material similar to the material in the conductive plane (260). Examples of voltage tap materials may include metals such as gold, copper, aluminum, a multilayer stack such as titanium/platinum/gold, or a multi-composite alloy such as nickel-germanium. The voltage taps (271, 272, 273) may be insulated from travelling wave electrodes (not shown) in the electro-optic modulator (200) using a dielectric layer or other insulating structure. For more information on the voltage taps and/or a conductive plane in accordance with one or more embodiments, see U.S. patent application Ser. No. 14/263,491, titled "MACH-ZEHNDER MODULATOR WITH BACKPLANE VOLTAGE EQUALIZATION", filed on Apr. 28, 2014, which issued as U.S. Pat. No. 9,244,327, and which is incorporated herein by reference. In, U.S. patent application Ser. No. 14/263,491, the conductive plane may be referred to as a "backplane."

In one or more embodiments, a computing device (275) is coupled to one or more of the voltage taps (271, 272, 273). The computing device (275) may include functionality for controlling one or more differential voltages produced in the conductive plane (260). In one or more embodiments, for example, the computing device (275) may include hardware and/or software that include functionality for determining a specified band gap energy level for an optical waveguide. For example, the computing device (275) may be coupled to the voltage taps (271, 272, 273) through one or more power sources (not shown) with functionality to produce the differential voltages. Accordingly, the computing device (275) may include functionality for determining the differential voltages that correspond to a respective band gap energy level for a respective optical waveguide. Likewise, in one or more embodiments, the computing device (275) includes functionality to adjust one or more differential voltages generated by the voltage taps (271, 272, 273) to control at least a portion of the photon absorption of an input optical wave (210) obtained by the electro-optic modulator (200). In one or more embodiments, the electro-optic modulator (200) also includes functionality to adjust the differential voltages generated by the voltage taps (271, 272, 273) to dynamically tune the phase modulation of the output optical wave (280).

Returning to FIG. 1, in one or more embodiments, at least one of the optical waves (121, 122) may undergo a phase shift when a voltage is applied to the waveguide electrodes A (146) or the waveguide electrodes B (147). In one or more embodiments, for example, one of the waveguide electrodes (146, 147) may have an enhanced phase shift efficiency as a respective optical wave's photon energy approaches the band gap energy level. Specifically, phase shift efficiency may refer to the degree that a modulating voltage applied by a waveguide electrode translates into a phase shift with respect to an optical wave passing through the optical waveguide. For example, phase shift efficiency may be measured in an amount of phase shift degrees per unit of voltage. As such, a correlation may increase between a modulating voltage applied by one of the waveguide electrodes (146, 147) and the resulting optical wave phase shift as a function of the modulating voltage.

Furthermore, a monotonic relationship may exist between photon absorption and phase shift efficiency with respect to different band gap energy levels. In particular, changing a band gap energy level to increase the amount of photon absorption in an optical waveguide may increase the phase shift efficiency of a waveguide electrode coupled to the optical waveguide. Likewise, changing the band gap energy level to decrease the amount of photon absorption may also decrease the phase shift efficiency of the waveguide electrode. In one or more embodiments, an optical waveguide material may have a theoretical peak where the monotonic relationship breaks down.

Accordingly, in one or more embodiments, the voltage taps (271, 272, 273) are configured to produce differential voltages resulting in a band gap energy level for increasing phase shift efficiency and where the photon energy of the optical waves (121, 122) does not exceed the band gap energy level.

Furthermore, the electro-optic modulator (100) may be a series push-pull configuration. For example, in a series push-pull configuration, a single voltage signal or electric field may include functionality to modulate the phase of a pair of optical waves in anti-phase. Likewise, a waveguide electrode may impart a phase change to the optical wave passing through one of the optical waveguides (131, 132), and may also act as a capacitor in series with other waveguide electrodes coupled with the optical waveguide and as a load on a transmission line conductor between a traveling wave electrode and one of the optical waveguides (131, 132).

The electro-optic modulator (100) may further include an optical wave combiner (180). In particular, the optical wave combiner (180) may an optical structure that includes functionality to recombine optical wave A (121) and optical wave B (122) into an output optical wave (190). Likewise, changing the electric field on the phase modulating paths through the optical waveguides (131, 132) may generate constructive interference between the optical waves (121, 122) constructively or destructive interference when recombined. Thus, the electro-optic modulator (100) may control the amplitude or intensity of the output optical wave (190). In one or more embodiments, the phase of the output optical wave (190) is controlled through a variety of techniques such as by manipulating the phase modulation signal of one of the traveling wave electrodes (151, 152), or through the design of the electro-optic modulator (100). In one or more embodiments, both of the optical waves (121, 122) passing through the optical waveguides (131, 132) undergo a phase modulation. However, in other embodiments, a refractive index in an optical path through only one of the optical waveguides (131, 132) is modulated with respect to the other optical path of the other optical waveguide.

Moreover, in one or more embodiments, the electro-optic modulator (100) is a Mach-Zehnder optical modulator. For example, a Mach-Zehnder optical modulator may be driven using a single RF signal input or two RF signal inputs in anti-phase. In another example, in a single-ended design, two transmission line conductors may include a signal transmission line conductor (S) that conveys an input electrical signal to a waveguide electrode, and a ground transmission line conductor (G) connected to a ground reference. The single-ended design is sometimes referred to as an SG modulator (also known as a coplanar strip). However, the electro-optic modulator (100) may include other types of RF drives based on other arrangements of transmission line conductors within the electro-optic modulator (100). For example, the electro-optic modulator (100) may be an electro-optic modulator configured with differential-drive GSGSG and GSSG formats.

Moreover, a p-layer of a waveguide electrode may be in contact with a corresponding optical waveguide, while an n-layer of the waveguide electrode is in contact with a conductive plane (160). As such, the i-layer of the waveguide electrode may include a series of layers of InGaAsP of varying composition that may act as a waveguide core (e.g., waveguide core A (141), waveguide core B (142)). For example, an RF current may flow from a highly p-doped contact material beneath a waveguide electrode through the corresponding p-i-n junction and the conductive plane (160), and up through an opposite p-i-n junction. Thus, the direct current (DC) bias voltage of the conductive plane (160) may be determined by an external DC voltage source. For more information on a Mach-Zehnder optical modulator, see U.S. patent application Ser. No. 13/767,525, titled "MACH-ZEHNDER OPTICAL MODULATOR USING A BALANCED COPLANAR STRIPLINE WITH LATERAL GROUND PLANES", filed on Feb. 14, 2013, which issued as U.S. Pat. No. 9,069,223 B2, and which is incorporated herein by reference.

Figure 3:
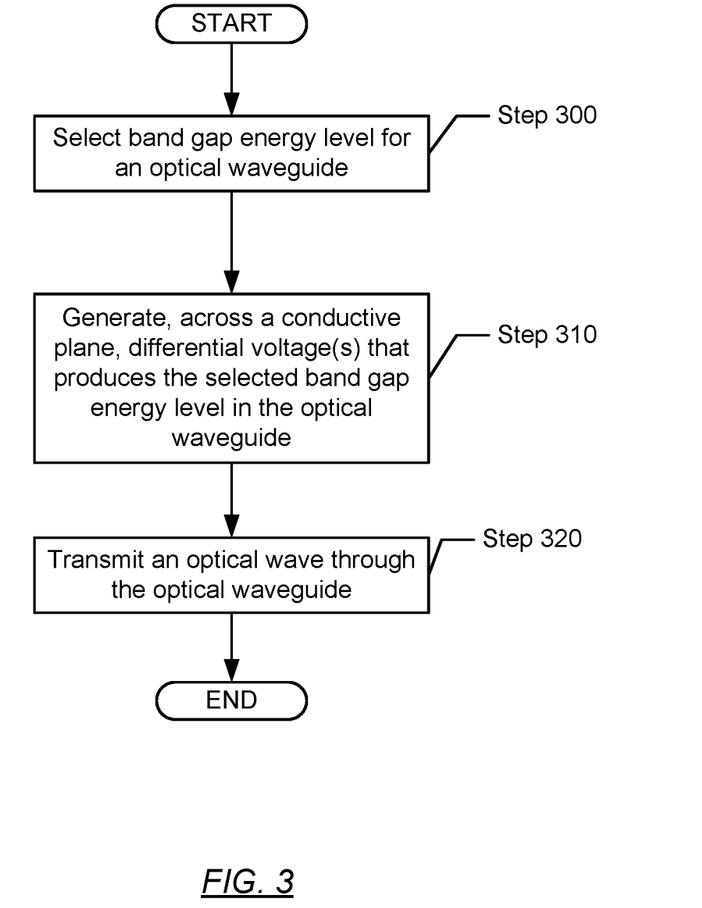
FIG. 3 shows a flowchart in accordance with one or more embodiments.

FIG. 3 shows a flowchart in accordance with one or more embodiments. Specifically, the process depicted in FIG. 3 may be used to control the band gap energy level within an optical waveguide. Likewise, the process shown in FIG. 3 may involve, for example, one or more components discussed above in reference to FIGS. 1 and/or 2 (e.g., computing device (275)). While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 300, a band gap energy level is selected for an optical waveguide in accordance with one or more embodiments. In one or more embodiments, for example, a computing device determines a band gap energy level for a desired amount of enhanced phase shift efficiency of a waveguide electrode coupled to the optical waveguide and/or to avoid a specified amount of photon absorption of an optical wave. Step 300 may be performed in advance of performing steps 310 and 320 below, for example, at the design stage of an electro-optic modulator. In some embodiments, Step 300 may be dynamically performed by the computing device based on monitoring the type of input optical wave to optical waveguide.

For example, an optical system may detect the wavelength and/or intensity of an input optical wave for an electro-optic modulator. In some embodiments, the specific type of optical source may be known by the computing device, and thereby, the computing device may have stored information designating the type of input optical wave generated by the optical source. Accordingly, in one or more embodiments, the computing device uses information regarding the input optical source to automatically determine a desired band gap energy level. For example, the computing device may have a lookup table to match a type of input optical wave with a respective band gap energy level for a respective waveguide core in an optical waveguide. While the optical waveguide in Step 300 may correspond to optical waveguide A (131) and optical waveguide B (132) in FIG. 1, the optical waveguide may refer to any component within an optical system that an optical wave may pass through, such as optical combiners, optical wave dividers, etc.

In one or more embodiments, a user determines a particular band gap energy level for the optical waveguide using the computing device. For example, a user may designate a specified amount of phase efficiency or photon absorption in a particular optical waveguide that the computing device and/or electro-optic modulator translates to a particular band gap energy level.

In one or more embodiments, the band gap energy level is selected by the electro-optic modulator without a computing device. For example, if the optical source is known, the desired band gap energy level may be implemented as a static value in the electro-optic modulator. Accordingly, analog hardware may exist in an electro-optic modulator to select the band gap energy level.

In Step 310, one or more differential voltages are generated across a conductive plane that produces a selected band gap energy level in an optical waveguide in accordance with one or more embodiments. In one or more embodiments, for example, one or more voltage taps are connected to a conductive plane in an electro-optic modulator to produce the one or more differential voltages. For example, the conductive plane may be similar to the conductive plane described in FIGS. 1 and 2 and the accompanying description. Likewise, the voltage taps may be similar to the voltage taps described in FIG. 2 and the accompanying description.

In one or more embodiments, a differential voltage produced by a heating electric current increases the temperature around one or more components within an electro-optic modulator. In one or more embodiments, for example, the differential voltage heats a waveguide core inside an optical waveguide to adjust the band gap energy level inside the optical waveguide. As such, in one or more embodiments, various voltage taps coupled to a conductive plane produce the band gap energy level selected in Step 300.

In one or more embodiments, voltage taps coupled dynamically tune various band gap energy levels over time. For example, as frequency and other optical wave properties change in an input optical wave, the voltage taps may adjust the band gap energy levels in an optical waveguide to compensate for these changes. Moreover, as different band gap energy levels are selected in Step 300, the voltage taps may subsequently produce the band gap energy levels.

Likewise, in one or more embodiments, the voltage taps selectively tune different components within an electro-optic modulator. In one or more embodiments, for example, a computing device produces heat within the conductive plane for one or more components within the electro-optic modulator while avoiding or turning off heat for other optical system components. For example, in an optical waveguide section that is coupled to a traveling wave electrode (i.e., through various waveguide electrodes), phase shift efficiency may be the primary concern. As such, the voltage taps may produce heat using differential voltages to increase the phase shift efficiency of a respective waveguide electrode coupled to the optical waveguide section. For components in the electro-optic modulator, differential voltages may be selected that avoid heating those components where phase shift efficiency is not a concern.

In some embodiments, various components within the electro-optic modulator such as optical wave dividers, optical wave combiners, etc., may not relate to the phase modulation of an optical wave. Accordingly, the voltage taps may generate a heating current proximate these components to produce band gap energy levels with minimal photon absorption and without respect to phase shift efficiency.

In one or more embodiments, the more voltage taps that are coupled to the conductive plane, the lower the amount of deviation from the average electric potential is required to obtain the same amount of Joule heating. For example, deviations from the average electric potential of the conductive plane may be interleaved among the voltage taps in order to maintain the average electric potential, while at the same time minimizing voltage non-uniformity within the conductive plane.

In Step 320, an optical wave is transmitted through an optical waveguide in accordance with one or more embodiments. For example, in response to generating the selected band gap energy level from Step 300 in the optical waveguide in Step 310, an optical source may transmit the optical wave through the optical waveguide, accordingly. Thus, a waveguide electrode coupled to the optical waveguide may experience enhanced phase efficiency and/or the optical wave may experience a reduced probability of photon absorption based on the selected band gap energy level from Step 300. The optical wave may be the output optical wave described in FIGS. 1 and 2 and the accompany description. In some embodiments, the optical wave may be an optical wave transmitted through some portion of an electro-optic modulator.

Figure 4:
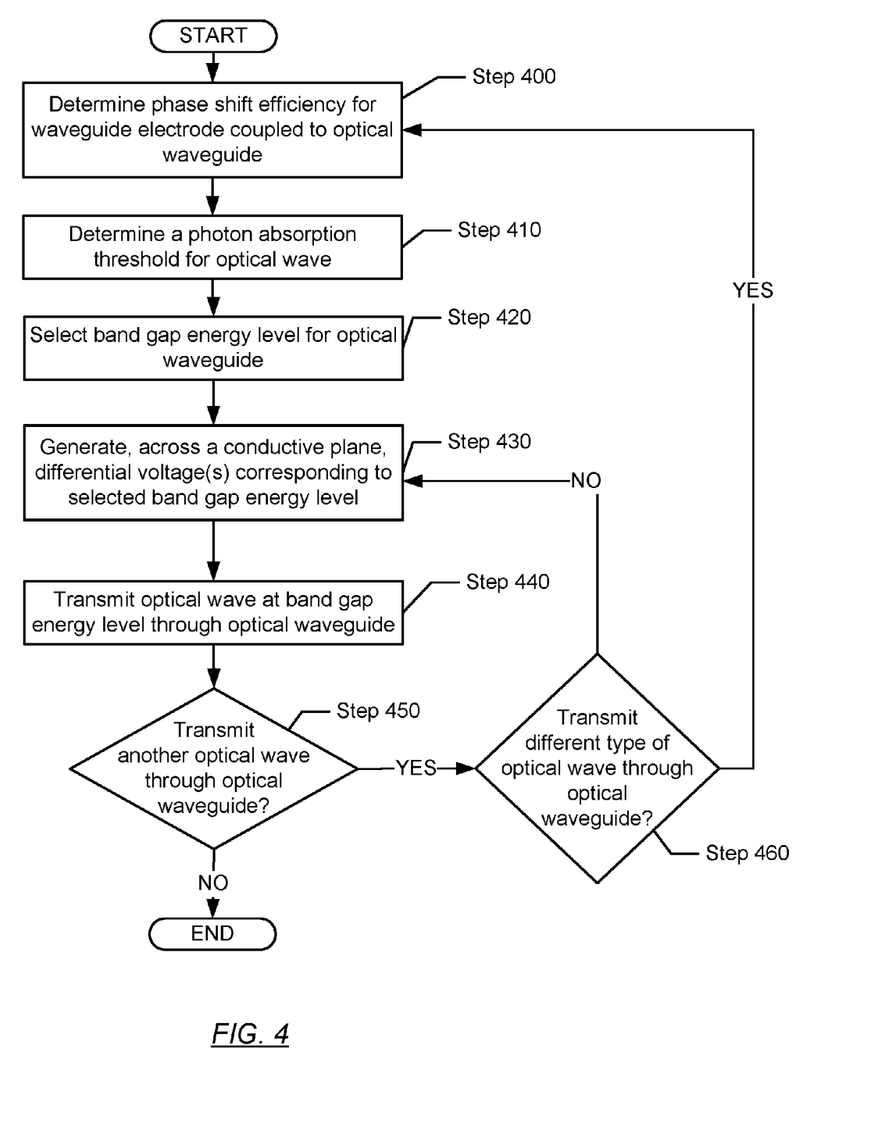
FIG. 4 shows a flowchart in accordance with one or more embodiments.

FIG. 4 shows a flowchart in accordance with one or more embodiments. Specifically, the process depicted in FIG. 4 may be used to control the band gap energy level within an optical waveguide. For example, the process depicted in FIG. 4 may provide dynamic tuning for a variety of different band gap energy levels in an optical system. As the frequency of an input optical wave changes, the optical system may reconfigure different band gap energy levels in one or more optical system components to adjust for changes in phase shift efficiency and/or photon absorption. Likewise, the process shown in FIG. 4 may involve, for example, one or more components discussed above in reference to FIGS. 1 and/or 2 (e.g., computing device (275)). While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 400, a phase shift efficiency is determined for an optical waveguide in accordance with one or more embodiments. For example, a computing device may determine whether a particular optical waveguide is a waveguide branch for phase modulating an optical wave in a Mach-Zehnder optical modulator. If the optical waveguide is used for phase modulation, the computing device may determine a particular phase shift efficiency for a respective waveguide electrode coupled to the optical waveguide. In some embodiments, if the optical wave is merely passing through an optical waveguide and/or other optical structure within an optical system that is not being used for phase modulation, no specific amount of phase shift efficiency may be desired, and thus phase shift efficiency may be ignored by the computing device.

In Step 410, a photon absorption threshold is determined for an optical wave in accordance with one or more embodiments. In one or more embodiments, for example, the photon absorption threshold is a specified probability that photons of the optical wave are absorbed by material in an optical waveguide. Likewise, the photon absorption threshold may correspond to a particular band gap energy level within a waveguide core inside an optical waveguide. As such, if the optical waveguide corresponds to a component within an electro-optical modulator, a computing device may compute a particular photon absorption threshold for a desired amount of optical loss within the optical waveguide.

In Step 420, a band gap energy level is selected for an optical waveguide in accordance with one or more embodiments. In one or more embodiments, Step 420 is similar to Step 300 and the accompanying description as described above. In one or more embodiments, for example, a computing device uses the phase shift efficiency determined in Step 400 and/or the photon absorption threshold determined in Step 410 to compute a respective band gap energy level for the optical waveguide.

In Step 430, one or more differential voltages are generated across a conductive plane that produces a selected band gap energy level in an optical waveguide in accordance with one or more embodiments. Step 430 may be similar to Step 310 and the accompanying description as described above. Likewise, in one or more embodiments, various voltage taps generate various differential voltages to generate the band gap energy level that is selected in Step 420.

In Step 440, an optical wave is transmitted at a selected band gap energy level through the optical waveguide in accordance with one or more embodiments. Step 440 may be similar to Step 320 and the accompanying description as described above. Accordingly, a waveguide electrode coupled to the optical waveguide may experience an enhanced phase shift efficiency and/or the optical wave may experience less optical loss in passing to another component within an optical system.

In Step 450, a determination is made whether another optical wave is transmitted through an optical waveguide in accordance with one or more embodiments. In particular, a computing device may determine whether an electro-optic modulator is modulating an output optical wave. For example, if the computing device determines that the electro-optic modulator or an optical source in the electro-optic modulator is done transmitting, the computing device may determine that no more optical waves are being transmitted through the optical waveguide. In some embodiments, if the electro-optic modulator is continuing to modulate various optical signals, the computing device may determine that another optical wave will be transmitted through the optical waveguide.

When a determination is made that no more optical waves are being transmitted through the optical waveguide, the process may proceed to end. When a determination is made that another optical wave is being transmitted through the optical waveguide, the process may proceed to Step 460.

In Step 460, a determination is made whether a different type of optical wave is transmitted through an optical waveguide in accordance with one or more embodiments. In one or more embodiments, for example, the frequency of an input optical wave changes within an optical system. For example, a computing device may adjust the frequency produced by an optical source or a different optical source may be used to generate an input optical wave. By changing the frequency of an optical wave, a different band gap energy level may be selected in Step 420 for the new optical wave being transmitted through the optical waveguide. Thus, an electro-optic modulator and/or other optical system may be reconfigured for different input optical wave types.

In one or more embodiments, for example, an optical waveguide is configured to accommodate light waves that have a range of photon energies over optical vacuum wavelengths from 1527 nanometers (nm) to 1568 nm. Thus, a band gap energy level may be selected in Step 420 that provides a desired phase shift efficiency and/or photon absorption threshold for one or more types of optical waves passing through the optical waveguide.

In one or more embodiments, for example, optical waves generated by an optical source in an electro-optic modulator changes over time. Based on different types of optical waves, Step 400, Step 410, and/or Step 420 may be performed again to select a different band gap energy level for the particular optical waveguide. Accordingly, different phase shift efficiencies and/or a different photon absorption thresholds may be desired based on changes to optical wave properties of an input optical wave. For example, if the amplitude of the optical wave weakens (e.g., the optical source is overheating), a computing device may determine a band gap energy level that further reduces the probability that photons are absorbed within the optical waveguide.

When a determination is made that the same type of optical wave is being transmitted through the optical waveguide, the process may proceed to Step 430. When a determination is made that a different type of optical wave is being transmitted through the optical waveguide, the process may proceed to Step 400.

Figure 5:
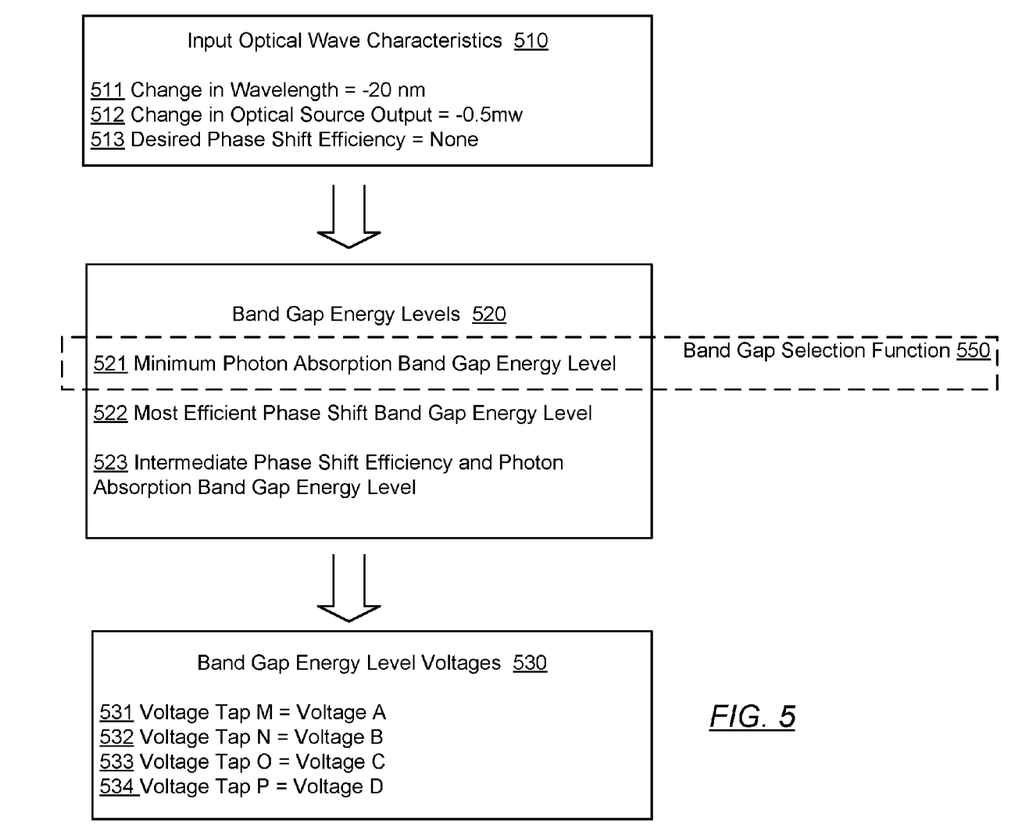
FIG. 5 shows an example in accordance with one or more embodiments.

Turning to FIG. 5, FIG. 5 provides an example of selecting and implementing a band gap energy level within an optical waveguide. The following example is for explanatory purposes only and not intended to limit the scope of the invention.

Turning to FIG. 5, a computing device obtains various input optical wave characteristics (510) (i.e., change in wavelength (511), change in optical source output (512), and a desired phase shift efficiency (513)) of a waveguide electrode coupled to an optical waveguide in an optical system. Specifically, the input optical wave characteristics (510) describe various changes with respect to a previous input optical wave. For example, the current input optical wave has a wavelength that is 20 nm less than the previous optical wave. Thus, photon energy in the current input optical wave has increased in comparison to the previous optical wave. Likewise, the change in optical source output (512) designates that the current input optical wave has a decrease of 0.5 milliwatts (mW) in power with respect to the previous optical wave. As such, the current input optical wave has a weaker optical signal than the previous optical wave. Furthermore, the desired phase shift efficiency (513) is none. In other words, a computing device may determine that phase shift efficiency is not a relevant factor with respect to calculating a specific band gap energy level for the optical waveguide. Therefore, phase shift efficiency is ignored with respect to the current optical wave passing through the optical waveguide.

Keeping with FIG. 5, a computing device uses the input optical wave characteristics (510) as inputs to a band gap selection function (550). Based the type of current input optical wave being transmitted through the optical waveguide, the computing device uses the band gap selection function (550) to pick the ideal band gap energy level. Because phase shift efficiency is being ignored with respect to the optical waveguide, the band gap selection function (550) ignores the most efficient phase shift band gap energy level (522) and the intermediate phase shift efficiency and photon absorption band gap energy level (523) and selects the minimum photon absorption band gap energy level (521). Accordingly, the selected band gap energy level may eliminate the maximum amount of optical loss associated with photon absorption in the optical waveguide.

Based on the selected band gap energy level, the computing device further computes various band gap energy level voltages (530) to implement the selected band gap energy level within the optical system. Accordingly, the computing device calculates voltage A for voltage tap M (531), voltage B for voltage tap N (532), voltage C for voltage tap O (533), and voltage D for voltage tap P (534). By configuring the voltage taps (531, 532, 533, 534) with these voltages, the computing device produces the selected band gap energy level in the optical waveguide.

In another example, an optical source's output power may increase in an optical system. In this scenario, a computing device may intentionally heat up one or more optical components in order to increase an amount of photonic absorption within the one or more optical components. For example, the computing device may desire that the output optical power remain substantially constant within the optical system. As such, the processes described in FIGS. 3 and/or 4 may implement a variable optical attenuator. In particular, where phase shift efficiency of a waveguide electrode is ignored, the computing device may heat the one or more optical components within an optical system using various differential voltages on a conductive plane to produce a desired amount of photonic absorption within each optical component.

Figure 6:
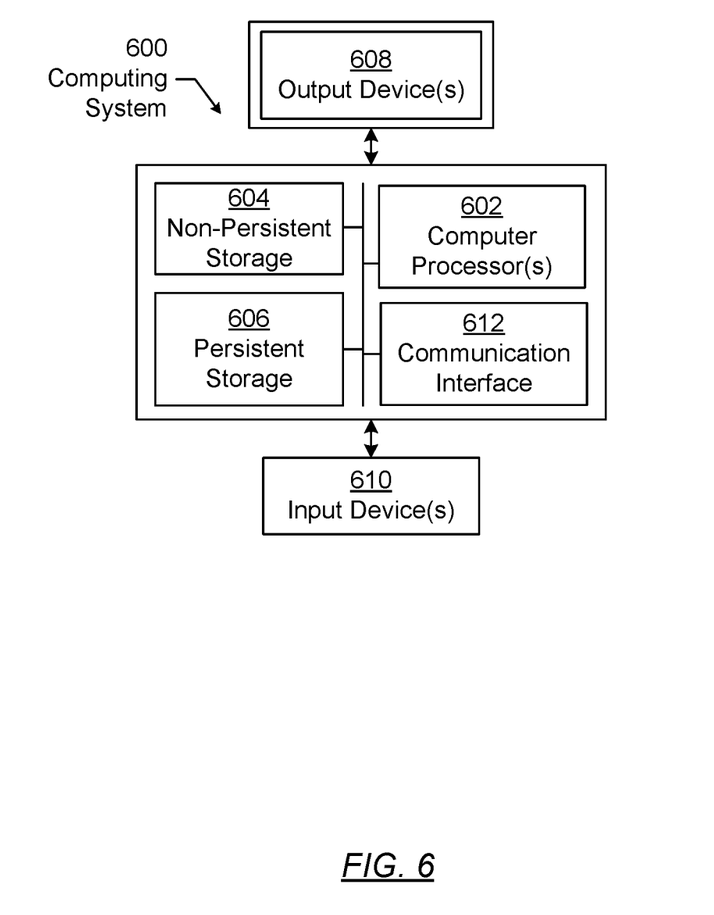
FIG. 6 shows a computing system in accordance with one or more embodiments.

Embodiments may be implemented on a computing system. Any combination of mobile, desktop, server, router, switch, embedded device, or other types of hardware may be used. For example, as shown in FIG. 6, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (607), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system or group of computing systems described in FIG. 6 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At the point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (600) in FIG. 6. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6, while performing one or more embodiments of the invention, may perform data comparison. Data comparison may be used to compare two or more data values (e.g., A, B). For example, one or more embodiments may determine whether $A>B$, $A=B$, $A \mathrel{!=} B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 6. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of operating an optical system, comprising:
   selecting a first band gap energy level for a first optical waveguide in an electro-optic modulator, wherein the first band gap energy level corresponds to a predetermined phase shift efficiency of a waveguide electrode coupled to the first optical waveguide;
   generating, across a conductive plane in the electro-optic modulator, a differential voltage that produces a first predetermined temperature in a waveguide core of the first optical waveguide, wherein the first predetermined temperature corresponds to the first band gap energy level selected for the first optical waveguide; and
   transmitting, through the first optical waveguide and with a modulating voltage applied by the waveguide electrode, a first optical wave to an optical wave combiner, wherein the modulating voltage produces an amount of phase shift in the first optical wave at the predetermined phase shift efficiency.

2. The method of claim 1,
   wherein the electro-optical modulator comprises a voltage tap coupled to the conductive plane,
   wherein the voltage tap generates the differential voltage across the conductive plane, and
   wherein the first band gap energy level is selected by a computing device coupled to the voltage tap.

3. The method of claim 1,
   wherein the electro-optic modulator comprises a second optical waveguide,
   wherein the conductive plane is disposed underneath the first optical waveguide and the second optical waveguide.

4. The method of claim 3, further comprising:
   transmitting, through the second optical waveguide, a second optical wave to the optical wave combiner,
   wherein the optical wave combiner generates a third optical wave that is the superposition of the first optical wave and the second optical wave.

5. The method of claim 3, further comprising:
   selecting a second band gap energy level for the second optical waveguide, wherein the second band gap energy level corresponds a predetermined photon absorption threshold in a waveguide core in the second optical waveguide,
   wherein the differential voltage produces a second predetermined temperature in the waveguide core of the second optical waveguide,
   wherein the first predetermined temperature is different from the second predetermined temperature, and
   wherein the second predetermined temperature corresponds to the second band gap energy level selected for the second optical waveguide.

6. The method of claim 1,
   obtaining a predetermined photon absorption threshold for the first optical wave,
   wherein the predetermined photon absorption threshold corresponds to a probability that a portion of the first optical wave is not absorbed during transmission through the first optical waveguide, and
   wherein the first band gap energy level is selected to produce the predetermined photon absorption threshold within the first optical waveguide.

7. The method of claim 1, further comprising:
   determining a plurality of optical wavelengths for a plurality of optical waves transmitted through the first optical waveguide,
   wherein the band energy gap level is selected to produce a predetermined photon absorption threshold corresponding to a probability that the plurality of optical waves are not absorbed during transmission through the first optical waveguide.

8. The method of claim 1, further comprising:
   detecting a change in the first optical wave from a first frequency to a second frequency, wherein the first optical wave at the second frequency has a higher photon energy than the first optical wave at the first frequency; and
   selecting a second band gap energy level with a greater photon absorption threshold than the first band gap energy level.

9. The method of claim 1,
   wherein the predetermined phase shift efficiency corresponds to a predetermined amount of phase shift degrees in response to the modulating voltage applied to the first optical waveguide.

10. An optical system, comprising:
an optical wave combiner;
a first optical waveguide coupled to the optical wave combiner and configured to transmit a first optical wave to the optical wave combiner;
a waveguide electrode coupled to the first optical waveguide, wherein the waveguide electrode is configured to apply a modulating voltage to the first optical waveguide to produce an amount of phase shift in the first optical wave;
a second optical waveguide coupled to the optical wave combiner and configured to transmit a second optical wave to the optical wave combiner;
a conductive plane extending underneath the first optical waveguide and the second optical waveguide; and
a voltage tap coupled to the conductive plane,
wherein the voltage tap is configured to generate a first differential voltage across the conductive plane,
wherein the first differential voltage is configured to produce a first predetermined temperature in a waveguide core of the first optical waveguide, and
wherein the first predetermined temperature corresponds to a first band gap energy level and a predetermined phase shift efficiency of the waveguide electrode in applying the modulating voltage.

11. The optical system of claim 10, further comprising:
an optical structure configured to divide an input optical wave into the first optical wave and the second optical wave; and
a travelling wave electrode extending over the first optical waveguide and the second optical waveguide,
wherein the traveling wave electrode comprises a plurality of waveguide electrodes coupled to the first optical waveguide, and
wherein the travelling wave electrode is configured to modulate a phase of the first optical wave relative to a phase of the second optical wave.

12. The optical system of claim 10, further comprising:
a computing device coupled to the voltage tap,
wherein the computing device is configured to select the first band gap energy level, and
wherein the computing device is further configured to determine the differential voltage generated by the voltage tap.

13. The optical system of claim 12,
wherein the computing device is further configured to select the first band gap energy level to produce a predetermined photon absorption threshold and a predetermined phase shift efficiency in the first optical waveguide for the first optical wave.

14. The optical system of claim 12,
wherein the computing device is further configured to detect a change in the first optical wave from a first frequency to a second frequency,
wherein the first optical wave at the second frequency has a higher photon energy than the first optical wave at the first frequency, and
wherein the computing device is further configured to select a second band gap energy level with a greater photon absorption threshold than the first band gap energy level.

15. The optical system of claim 14,
wherein the computing device is further configured to generate a second differential voltage using the voltage tap, and wherein the second differential voltage is configured to produce a second temperature in a waveguide core of the first optical waveguide, and
wherein the second temperature corresponds to the second band gap energy level for the first optical waveguide.

16. A non-transitory computer readable medium storing instructions for operating an optical system, the instructions comprising functionality for:
selecting a first band gap energy level for a first optical waveguide in an electro-optic modulator, wherein the first band gap energy level corresponds to a predetermined phase shift efficiency of a waveguide electrode coupled to the first optical waveguide;
generating, across a conductive plane in the electro-optic modulator, a differential voltage that produces a first predetermined temperature in a waveguide core of the first optical waveguide, wherein the first predetermined temperature corresponds to the first band gap energy level selected for the first optical waveguide; and
transmitting, through the first optical waveguide and with a modulating voltage applied by the waveguide electrode, a first optical wave to an optical wave combiner,
wherein the modulating voltage produces an amount of phase shift in the first optical wave at the predetermined phase shift efficiency.

17. The non-transitory computer readable medium of claim 16,
wherein the electro-optical modulator comprises a voltage tap coupled to the conductive plane,
wherein the voltage tap generates the differential voltage across the conductive plane, and
wherein the first band gap energy level is selected by a computing device coupled to the voltage tap.

18. The non-transitory computer readable medium of claim 16,
wherein the electro-optic modulator comprises a second optical waveguide,
wherein the conductive plane is disposed underneath the first optical waveguide and the second optical waveguide.

19. The non-transitory computer readable medium of claim 16, wherein the instructions further comprise functionality for:
obtaining a predetermined photon absorption threshold for the first optical wave,
wherein the predetermined photon absorption threshold corresponds to a probability that a portion of the first optical wave is not absorbed during transmission through the first optical waveguide, and
wherein the first band gap energy level is selected to produce the predetermined photon absorption threshold within the first optical waveguide.

20. The non-transitory computer readable medium of claim 16, wherein the instructions further comprise functionality for:
selecting a second band gap energy level for a second optical waveguide in the electro-optic modulator, wherein the second band gap energy level corresponds to a predetermined photon absorption threshold in a waveguide core in the second optical waveguide,
wherein the differential voltage produces a second predetermined temperature in the waveguide core of the second optical waveguide,
wherein the first predetermined temperature is different from the second predetermined temperature, and wherein the second predetermined temperature corresponds to the second band gap energy level selected for the second optical waveguide.

\* \* \* \* \*